Figure 1:
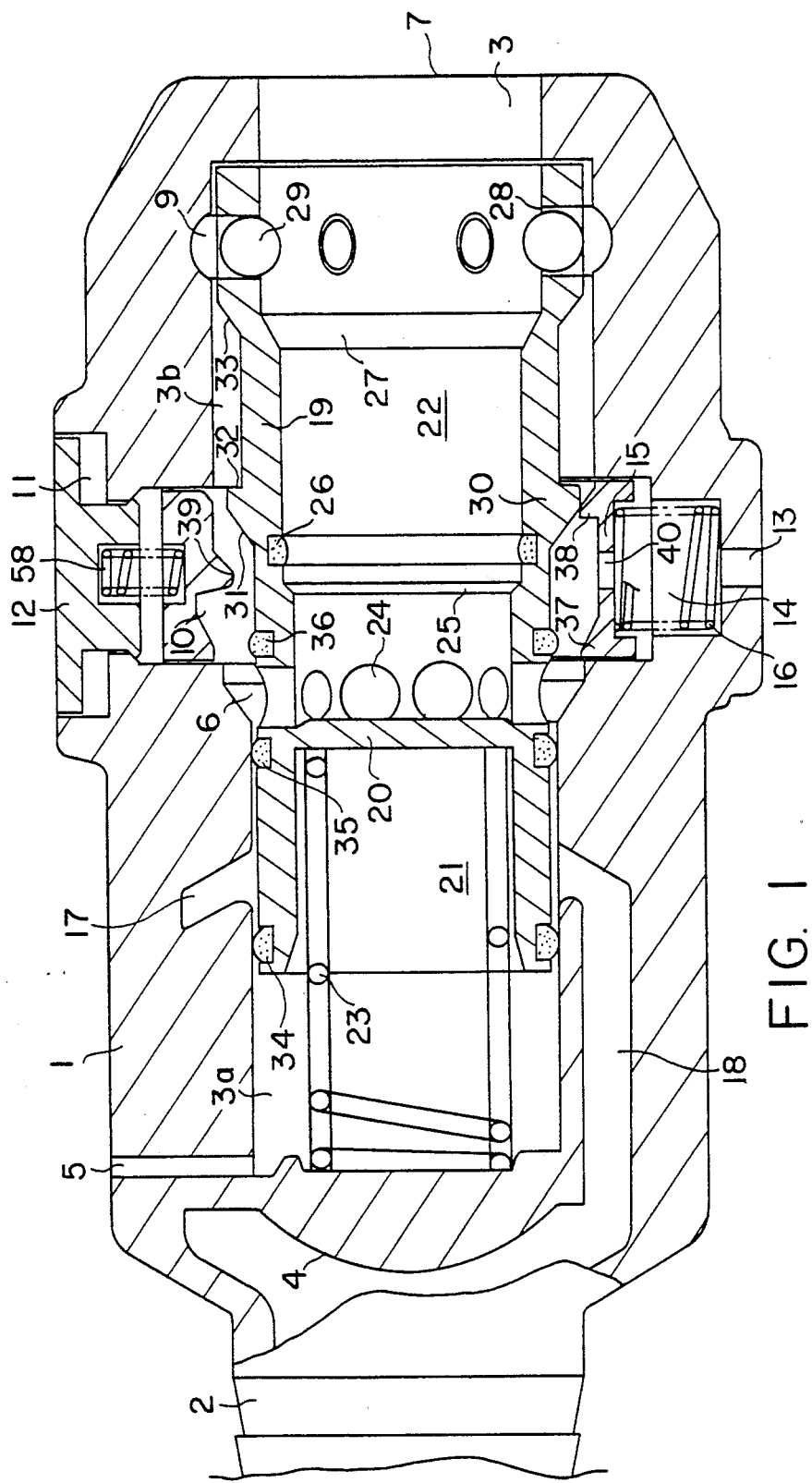

United States Patent [19]
Belisaire et al.

[11] Patent Number: 5,002,254
[45] Date of Patent: Mar. 26, 1991

[54] AUTOMATIC COUPLER FOR PRESSURIZED FLUID CIRCUIT

[75] Inventors: Daniel Belisaire, Cesson Sévigné; Pierre Serot, Fontenay aux Roses, both of France

[73] Assignee: Legris S.A., Rennes, France

[21] Appl. No.: 452,066

[22] Filed: Dec. 15, 1989

[30] Foreign Application Priority Data

Dec. 19, 1988 [FR] France .............................. 88 17048

[51] Int. Cl.⁵ ............................................ F16L 37/28
[52] U.S. Cl. ................................ 251/149.9; 251/149.8
[58] Field of Search ............... 251/149.6, 149.8, 149.9, 251/89.5

[56] References Cited

U.S. PATENT DOCUMENTS

| | | | |
|---|---|---|---|
| 2,263,293 | 11/1941 | Ewald | 251/149.6 |
| 4,436,125 | 3/1984 | Blenkush | 251/149.6 |
| 4,483,510 | 11/1984 | Palau et al. | 251/149.6 |
| 4,502,662 | 3/1985 | Maldavs et al. | 251/149.6 |
| 4,863,201 | 9/1989 | Carstens | 251/149.6 |

FOREIGN PATENT DOCUMENTS 0100900 12/1989 European Pat. Off. .

Primary Examiner—A. Michael Chambers
Attorney, Agent, or Firm—Roland Plottel

[57] ABSTRACT

An automatic coupler for pressurized fluid circuits is divulged of the type comprising a valve (19) sliding in a body (1), and means for balancing the upstream fluid pressure on the valve. The downstream portion of the latter forms a socket for receiving and sealingly locking a connector (8). The coupler comprises a means for locking the valve in two positions: one in which the valve is open and the other in which it is closed and the socket communicates with the atmosphere, the connector (8) being still locked. Release of the valve from the first position engages a locking means in an intermediate position whose release causes locking in the second position. The coupler of the invention reliably prevents the "whiplash" phenomenon produced, at the time of uncoupling, by the downstream pressure.

8 Claims, 9 Drawing Sheets

AUTOMATIC COUPLER FOR PRESSURIZED FLUID CIRCUIT

The present invention relates to automatic couplers used in pressurized fluid circuits, for example compressed air distribution networks in factories or workshops.

Automatic couplers are generally mounted at the ends of pipes connected to a pressurized fluid distribution conduit. They make possible the connection of pipes with connecting pieces which serve pneumatic tools, for example. In the inoperative condition, the couplers are closed by valves. The latter are urged towards the open position by the connector when it is inserted in the coupler, said open position only being reached once said connector is sealingly locked in the coupler. Uncoupling is achieved by means of a push button or a sliding ring on the coupler and closure of the valve takes place before unlocking of the connector.

In practice, such automatic couplers find applications in circuits where the fluid pressure may be high. In this case, if the valve is subjected to the pressure, coupling by insertion of a connector in the coupler which pushes the valve open may prove difficult, even impossible.

Furthermore, when the connector or the coupler or both are mounted at the end of a flexible pipe, there occurs what is called a "whiplash" during disconnection, caused by the release of the pressure in the downstream pipe. Even for low pressures, this phenomenon creates a risk of accidents for the user.

An automatic coupler with reduced coupling force and comprising an anti "whiplash" device is described in the European patent application EP-A-0 100 090. This coupler comprises a sleeve in which a valve is slidingly mounted. The fluid reaches the periphery of said valve so that it is not subjected to an axial thrust resulting from the pressure and so that only the action of a spring need be overcome for moving it. At the time of insertion of the connector of a downstream pipe in the coupler, said connector enters the downstream portion of the valve which forms a socket and, before abutment, a sealed connection is formed therebetween by an annular seal mounted in the internal face of the valve. So that the connector can pass into the annular seal, the valve is blocked in the sleeve by first balls engaged in holes in said valve. When the connector abuts in the valve, a hollow at its periphery corresponds with said balls, so that under the effect of the thrust of inserting the connector, they release the valve with respect to the sleeve, then permitting it to move back therein As soon as the backward movement has begun, the balls lock the connector in the valve, well before the latter reaches the open position. When this position is reached, a series of second balls in the sleeve block the downstream end of the valve and are retained in a locking position by means of a ring on the sleeve.

Figure 4:
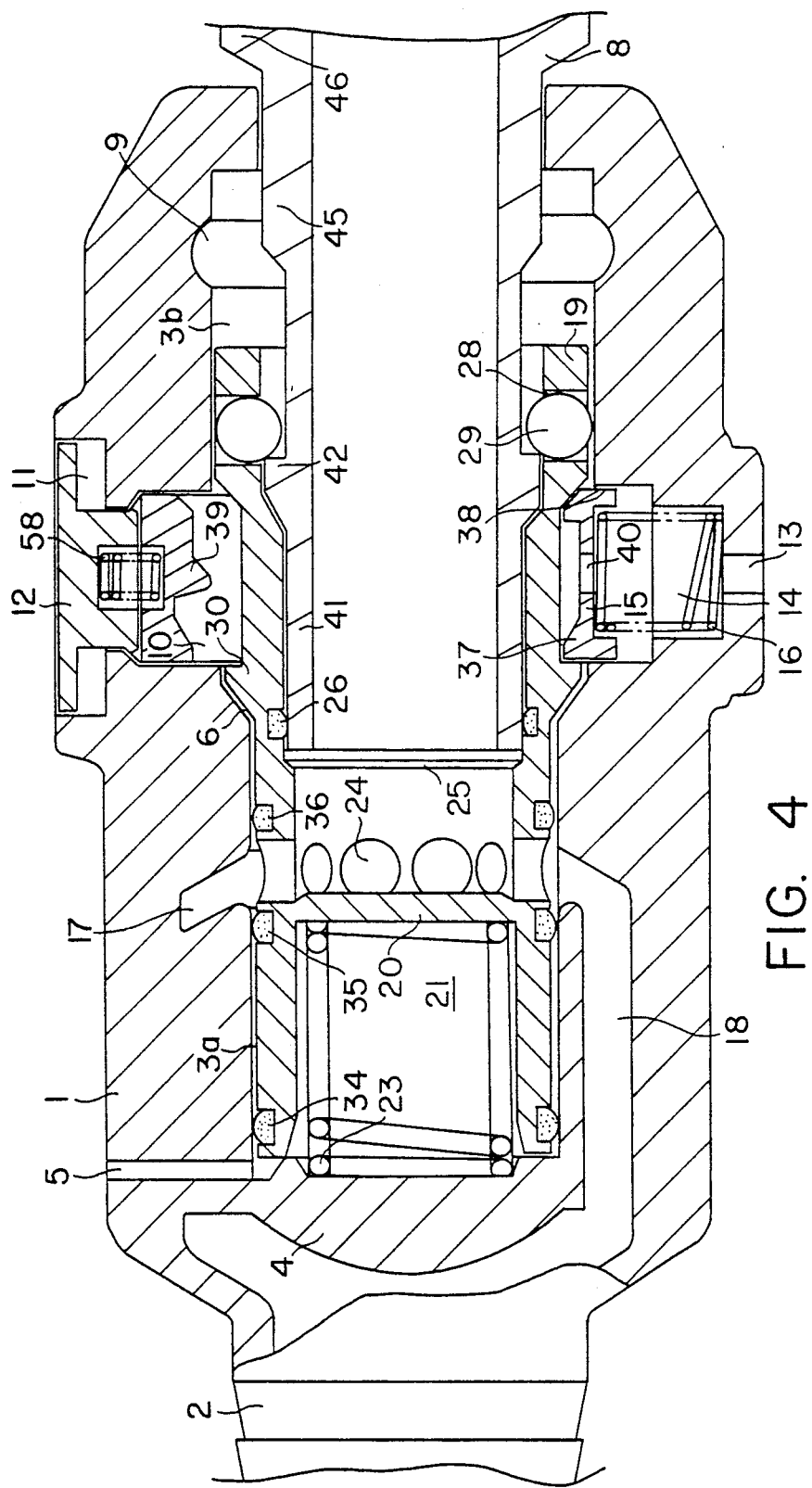

To disconnect by sliding the ring, the balls blocking the valve are unlocked, so that the valve advances from upstream to downstream in the sleeve under the action of the spring and closes the coupler. An intermediate position is reached, in which the force on the connector resulting from the pressure in the downstream valve is used to establish locking by jamming said first balls between a slanting shoulder on the connector and a slanting shoulder on the sleeve. This situation is illustrated in FIG. 4 of the patent. In this position, the fluid in the downstream pipe escapes through a vent and as soon as the downstream pressure, and consequently the jamming force of the balls, passes below a certain threshold, said balls leave their jamming position and release the valve from the sleeve so that the valve may reach its inoperative position and so that the connector may then be removed.

Although satisfactory for high operating pressures, the coupler described in this document is not reliable for medium or low pressures because the force exerted on the connector is not always sufficient for jamming the balls. Consequently, in the case of low pressures, the user is not completely protected from the "whiplash" risk.

An object of the invention is to provide an automatic coupler of the above described type which overcomes these drawbacks and which is simple and economic to manufacture.

According to the invention, in an automatic coupler whose body contains a sliding valve, with the pressure balanced on said valve in the axial direction, so that when the valve moves in the body of the coupler it is only urged by a return spring, the downstream portion of the valve forming a socket receiving a connector mounted on a pipe to be connected, having a means for sealingly locking the latter, a means is provided for locking the valve with respect to the body of the coupler in two positions:
 a first position or coupling position in which the valve is open, and
 a second position in which the valve is closed, the connector is locked in the valve and the socket receiving the connector of the valve is in communication with the atmosphere,
said locking means being automatically retracted then, urged by a spring, blocking the valve in the open position at the time the connector is inserted in the coupler, a means for releasing said locking means being also provided which, when it is actuated for releasing the valve from the first position, makes a locking means operational in an intermediate position between said first and second positions, until said release means is freed and permits the locking means in the intermediate position to retract, thus ensuring locking in the second position, the release means being actuated a second time so that the valve, urged by its spring, may continue its movement in the body of the coupler towards its inoperative position, the connector then being unlocked from the valve.

Figure 5:
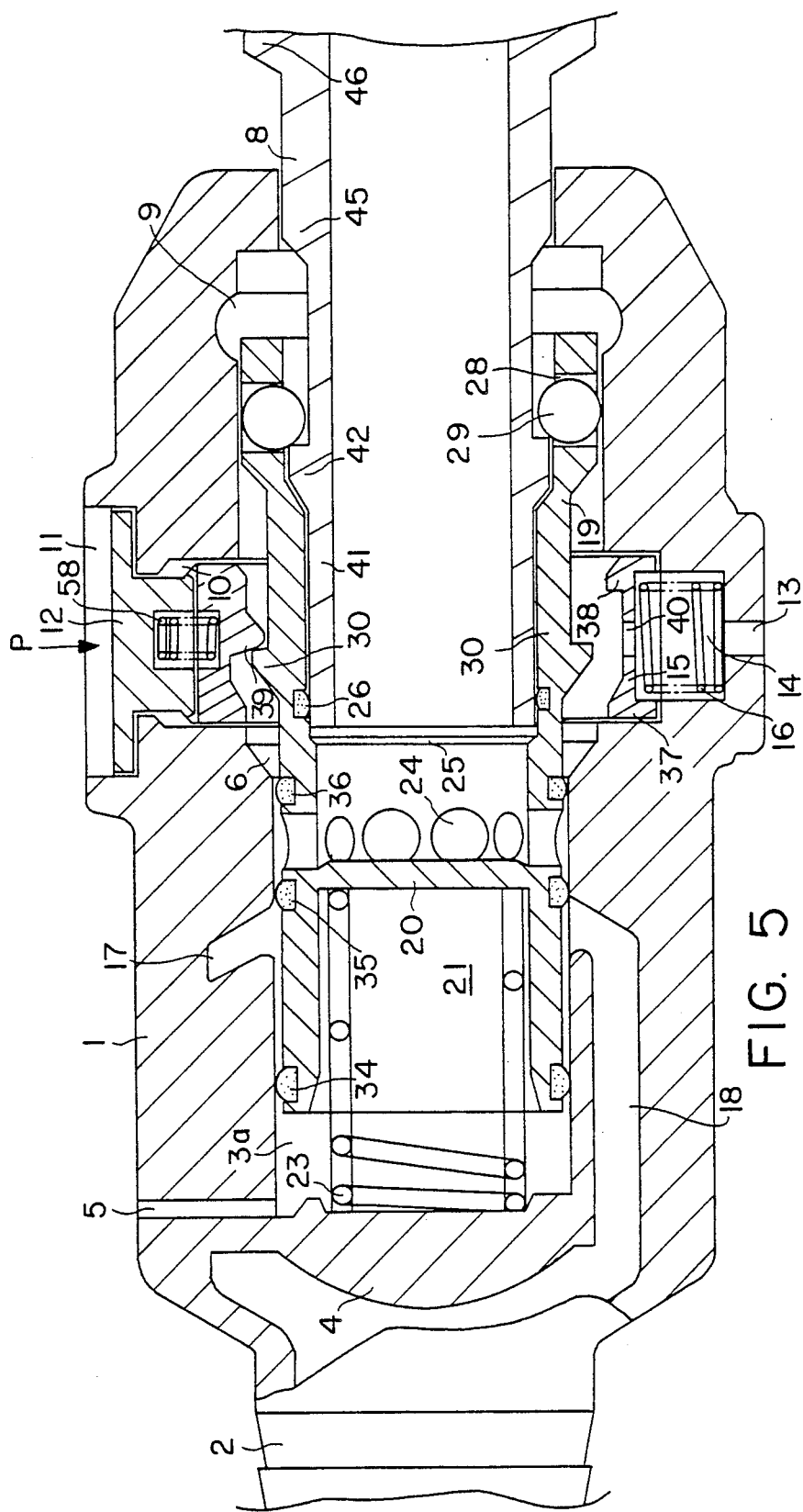
Figure 6:
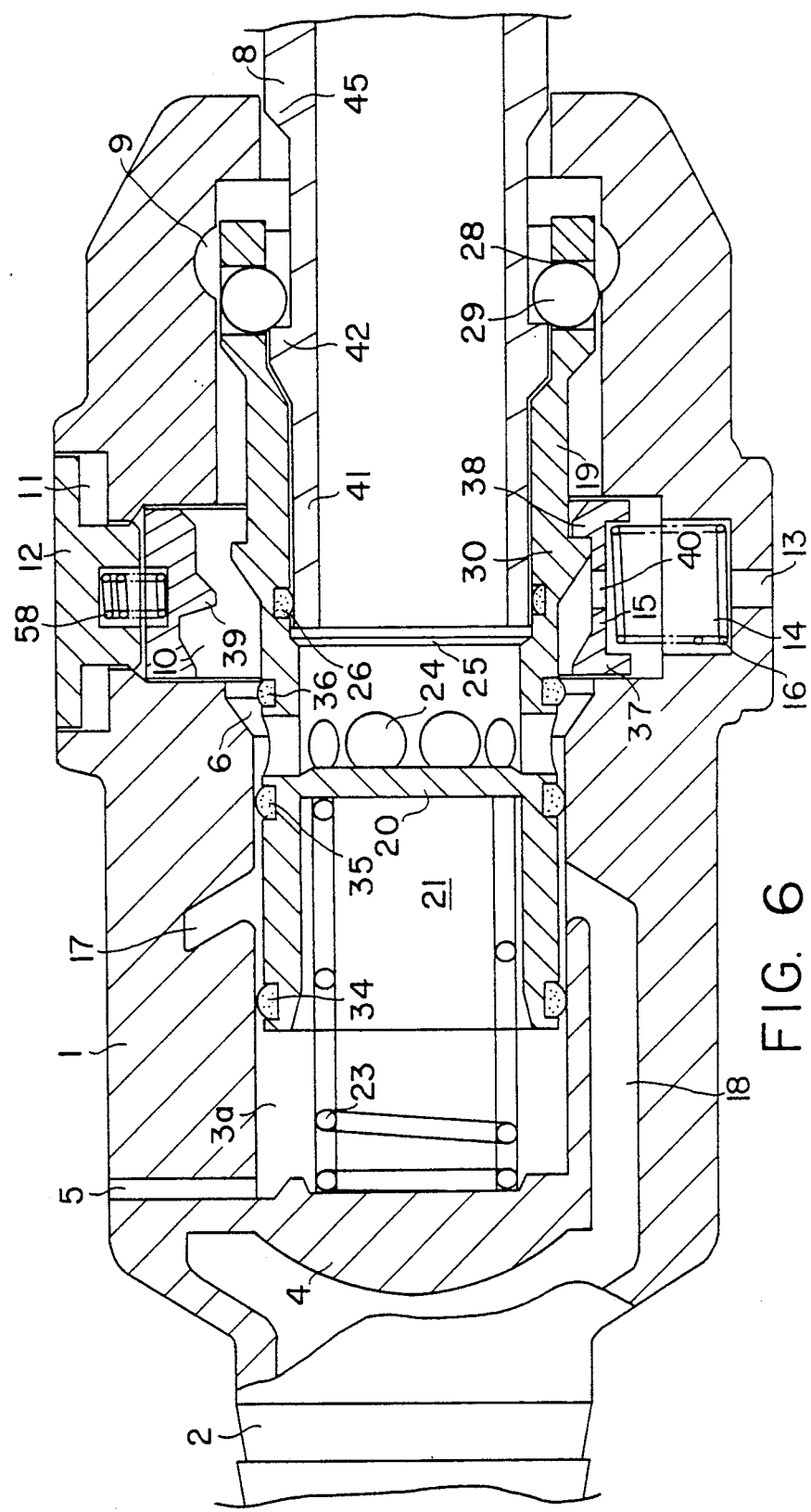
Figure 7:
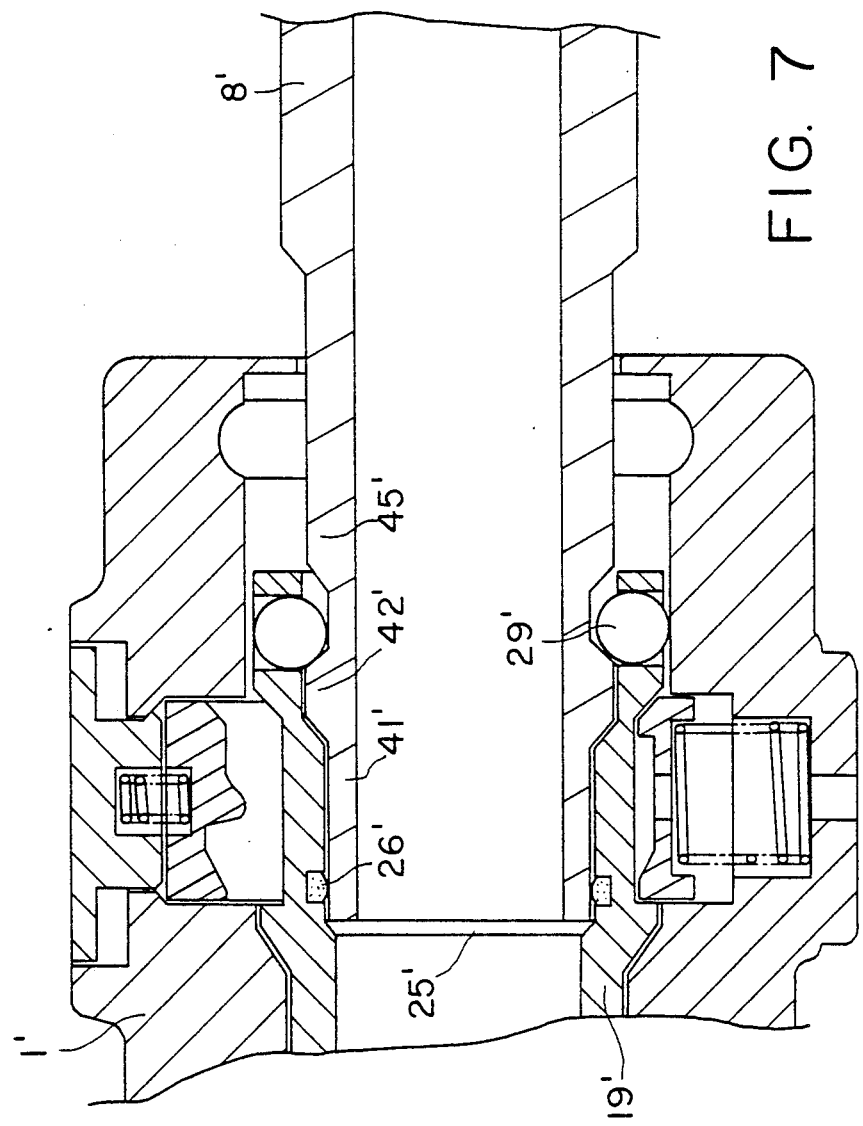

The above mentioned characteristics of the invention, as well as others, will be clear from the following description of embodiments, with reference to the accompanying drawings in which:

FIG. 1 is an axial sectional view of an automatic coupler according to the invention, FIGS. 2 to 6 are axial sectional views of the coupler of FIG. 1, in which a male connector mounted on a downstream pipe is engaged, and representing the main operating phases of the coupler, FIG. 7 is a partial view of the end portion of a coupler intended to receive a connector different from that shown in FIGS. 2 to 6, and FIGS. 8 and 9 are axial sectional views of couplers having means for balancing the pressure on the valve different from that of the couplers of FIGS. 2 to 7.

The coupler shown in FIGS. 1 to 6 comprises a body 1 having a general cylindrical configuration with, at its upstream end, a means 2 for connection to a pipe. Body 1 forms an internal chamber 3 with axial symmetry, open downstream and closed by a wall 4 at its upstream end. Near this end, chamber 3 is open to the free air through a vent 5.

From the wall 4, chamber 3 comprises a first bore 3a and a second bore 3b of larger diameter, defining a shoulder 6. The opening 7 at the downstream end of chamber 3 is constricted, its diameter being slightly greater than the largest diameter of the portion of a connector 8, FIGS. 2 to 6, to be received in the coupler. Furthermore, near the opening 7, the internal face of body 1 has a peripheral groove 9 with rounded profile.

In bore 3b of chamber 3, close to shoulder 6, the internal face of body 1 has a deep peripheral internal groove 10 open to the outside through a well 11 receiving a push button 12 and through a vent 13 to the bottom of a well 14 opposite well 11. Groove 10 is provided for receiving a locking ring 15 actuated by means of push button 12 and returned by a helical spring 16 housed in well 14.

A peripheral annular chamber 17, communicating with the connecting portion 2, through a plurality of peripheral ducts 18, opens into portion 3a of chamber 3.

In chamber 3 is provided a valve 19 having a substantially cylindrical configuration comprising an intermediate internal wall 20. Wall 20 separates an upstream bore 21 and a downstream bore 22 in the form of a socket. The end of bore 21 is open so as to house a helical spring 23 between wall 4 of bOdy 1 and wall 20. Chamber 22 is open at its downstream end, the diameter of the opening being substantially the same as that of opening 7 of body 1. From wall 20, chamber 22 comprises annularly disposed circular openings 24, an internal shoulder 25, an annular groove containing an annular seal 26, a shoulder 27 and a plurality of circular openings 28 in which balls 29 are housed which are free to leave partially inwardly or outwardly.

The external face of valve 19 has a cylindrical portion of the upstream end as far as the annular seal 26, for sliding in bore 3a of chamber 3. At the level of the annular seal 26, said external face forms an annular step 30 whose upstream face 31 is slanted and whose downstream face 32 is straight The slant of the upstream face 31 is substantially the same as that of shoulder 6 in chamber 3 of body 1. At the level of shoulder 27, the external face of valve 19 forms a corresponding shoulder 33, just upstream of the openings 28 housing the balls 29.

In its cylindrical portion, the external face of valve 19 has three more annular grooves containing respectively an annular seal 34 near the upstream end, an annular seal 35 just upstream of openings 24 and an annular seal 36 just downstream of openings 24. Seals 34 to 36 provide sealing on each side of chamber 17 between valve 19 and body 1, whatever the position of valve 19 in body 1, so that the pressure of the fluid reaching chamber 17 is balanced on the valve and so that the latter is subjected in the axial direction to the action of spring 23 only.

In practice, ring 15 is connected to the push button 12 by means of a spring 58. Preferably, push button 12 is crimped in well 11 of body 1, as shown in the drawings. In another embodiment, the push button 12 may be secured to ring 15. On its internal periphery, this ring comprises an upstream tooth 37 and a downstream tooth 38 in the vicinity of well 14 and an intermediate tooth 39 opposite, i.e. in the vicinity of push button 12. Teeth 37 and 38 have straight upstream faces and slanting downstream faces, whereas the two downstream and upstream faces of tooth 39 are slanted. Furthermore, between teeth 37 and 38, ring 15 is formed with a through-hole 40 opening into well 14.

When the coupler is inoperative, FIG. 1, valve 19, urged by spring 23 abuts against the internal edge of opening 7 of body 1 Balls 29 in holes 28 are situated opposite the annular groove 9 and the annular seals 34 and 35 are situated on each side of chamber 17. In addition, the edge of the upstream face 31 of step 30 of the valve abuts against the edge of the downstream face of tooth 38 of ring 15.

The male connector 8 shown in FIGS. 2 to 6 is a standard connector, generally used for fairly high pressures. From upstream to downstream, its external face forms a cylindrical end portion 41 of a diameter very slightly less than that of the inside of the valve between shoulders 25 and 27, an annular step 42 whose upstream face 43 is slanted and whose downstream face 44 is straight, having a diameter slightly less than that of opening 7 of body 1, a first swelling 45 of a diameter slightly less than that of opening 7 and, at a distance from the latter, a second swelling 46 of a larger diameter, shown in FIGS. 3 to 5.

Figure 2:
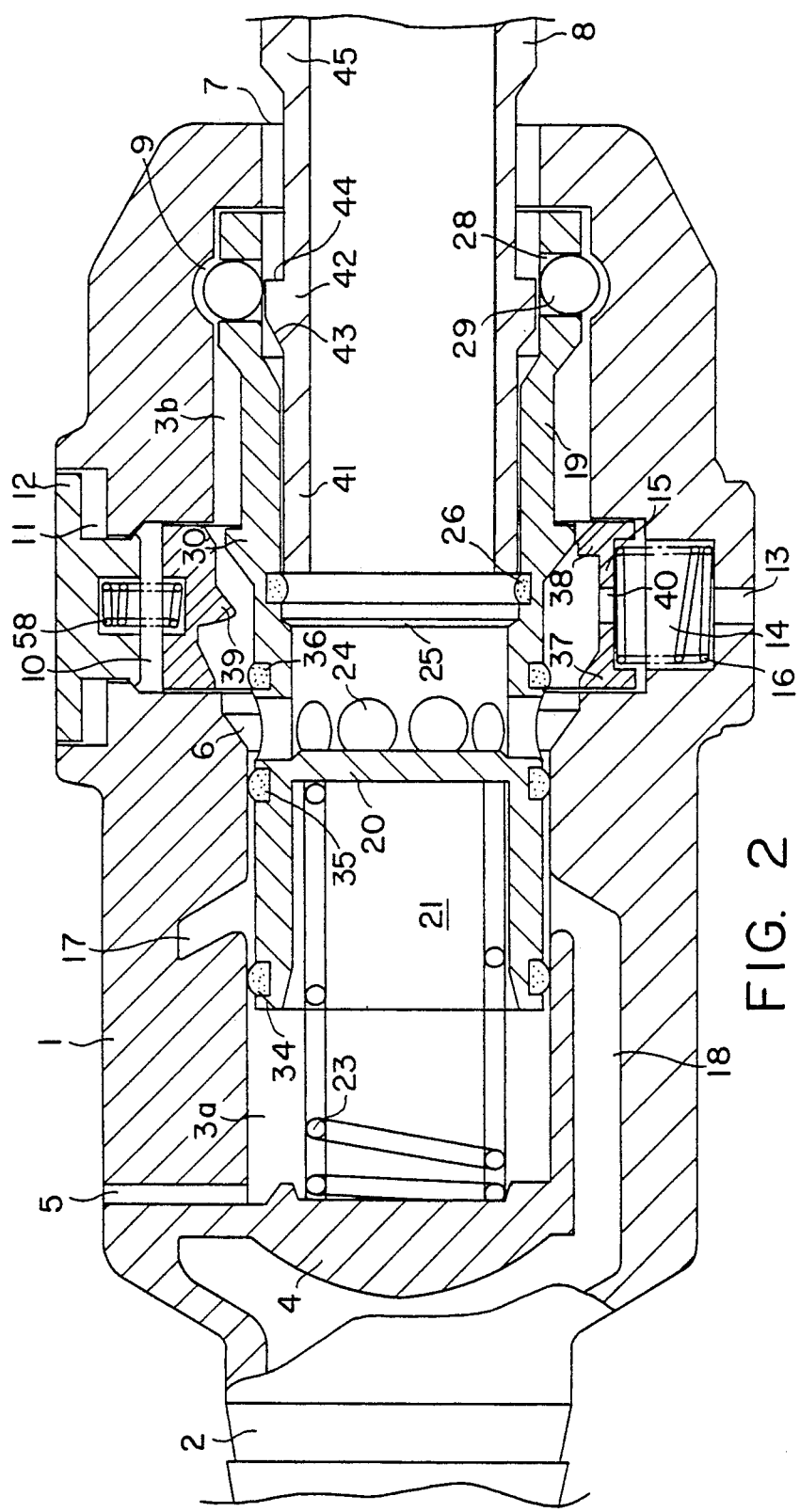

When connector 8 is inserted into the coupler, its cylindrical end portion 41 enters the socket formed by chamber 22 of the valve, upstream of shoulder 27, and step 42 causes balls 29 to retract into groove 9 of the body. This situation is illustrated in FIG. 2. By further insertion of connector 8, the end thereof comes into abutment against shoulder 25 of the valve and balls 29 are now beyond the step 42, consequently able to leave groove 9. A sealed connection is formed between the inside of the valve and connector 8 by the seal 26.

Figure 3:
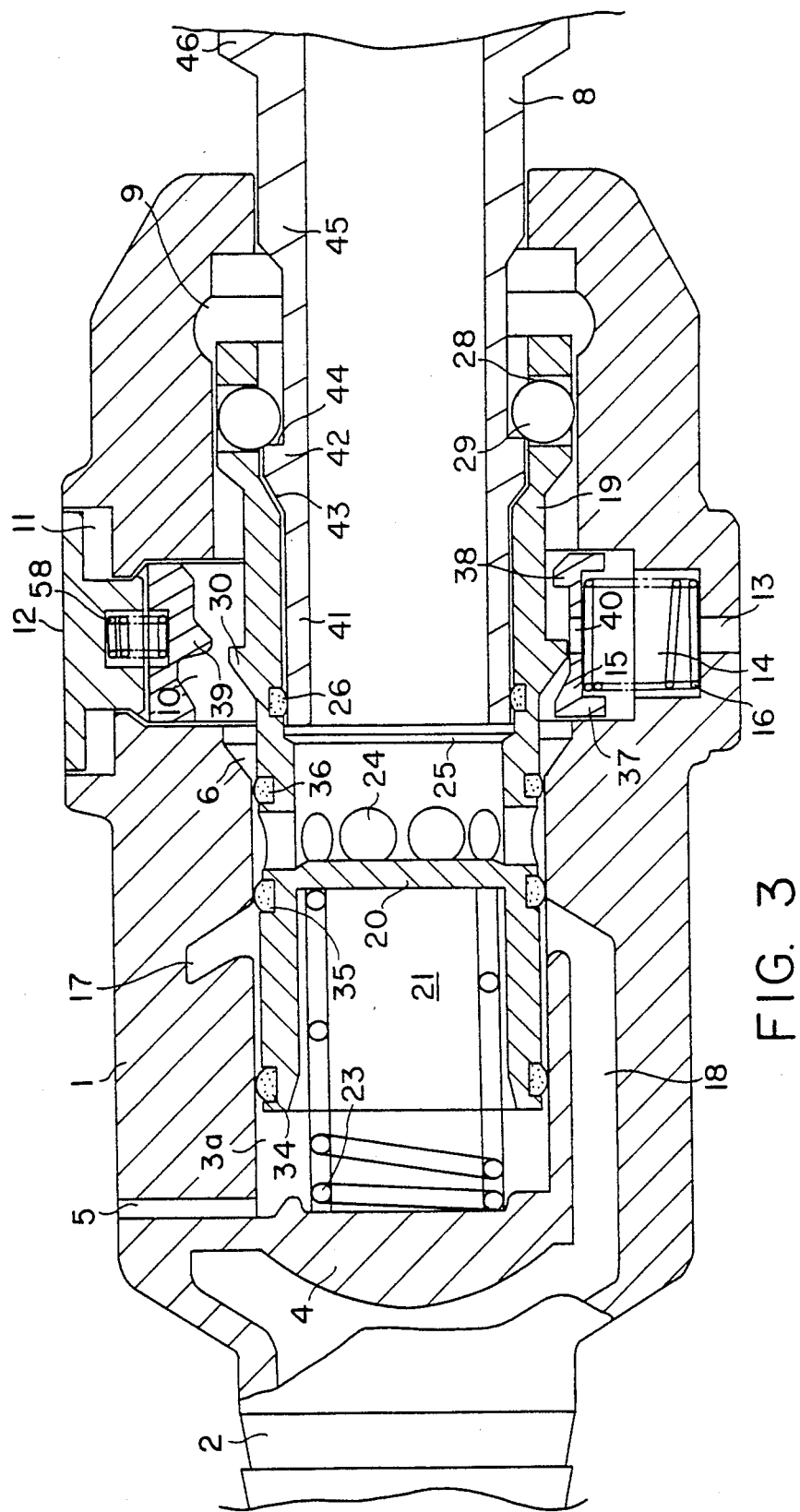

Further pushing of connector 8 now causes it to drive valve 19 upstream in body 1 against the action of spring 23. The balls 29 then lock connector 8 in valve 19, as shown in FIG. 3. The step 30 of the valve is situated between teeth 37 and 38 of ring 15 which advance in bore 3b under the action of spring 16. The annular seals 34 and 35 are still on each side of the annular chamber 17 and the coupler is therefore still closed.

Valve 19 reaches it open position or endmost upstream position in body 1 when the upstream face 31 of its step 30 abuts against shoulder 6 in chamber 3, FIG. 4. While passing to this position, step 30 has caused tooth 37 to retract which, urged by spring 16, has sprung up behind it for locking it. Balls 29 still lock connector 8 sealingly in valve 19. In this position, the annular seals 35 and 36 are situated on each side of the annular chamber 17 which communicates with the downstream chamber 22 of the valve and consequently the connector 8, through openings 24.

To disconnect connector 8 from the coupler, a first thrust P, FIG. 5, is exerted on push button 12, so that tooth 37 retracts and releases step 30 of valve 19. Thus, the intermediate tooth 39 is made operational against which the step 30, released from tooth 37, comes into abutment, as shown in FIG. 5. The stroke of valve 19 between these two positions is sufficient for the annular chamber 7 to be no longer in communication through openings 24 with the downstream chamber 22 of the valve. The coupler is therefore closed. However, the downstream pressure is not released because seals 35, 36 on each side of openings 24 are still in action on the wall of bore 3a, and because the sealed connection between connector 8 and valve 19 is maintained.

On release of push button 12, under the effect of spring 16 and of the step 30 of the valve acting on the slanting upstream face of the intermediate tooth 39, the latter retracts and simultaneously the downstream tooth 38 comes into the locking position. Step 30 released from the intermediate tooth 39 is therefore again locked by tooth 38. This position is illustrated in FIG. 6 where it is clearly shown that seal 36, which has gone beyond shoulder 6 in chamber 3, is no longer operational. The fluid in the downstream duct may then escape to the free air by passing through hole 40 in ring 15, well 14 and vent 13. In this position, connector 8 is again sealingly locked in the valve 19 by balls 29.

Finally, by exerting a second pressure on push button 12, the downstream tooth 38 of ring 15 is retracted and releases step 30 of the valve and the latter, urged by spring 23, moves until it abuts against the internal edge of opening 7, FIG. 1. It is only then that the connector 8 may be removed from valve 19.

The coupler shown partially in FIG. 7 differs from the coupler shown in FIGS. 1 to 6 only in that the downstream portions of its valve 19' and its body 1' are adapted for receiving another standard connector 8', used generally for medium or low pressures.

Connector 8' differs from connector 8 in that its cylindrical end portion 41' is shorter, and so the spacing between its step 42' and its first swelling 45' is shorter. Consequently, in valve 19' of FIG. 7, the shoulder 25' is offset upstream, as well as the annular seal 26', and the end portion of the valve beyond balls 29' is shorter. The downstream end portion of body 1' is also shortened. This coupler operates exactly in the same way as the coupler of FIGS. 1 to 6. The description of connectors 8 and 8' is obviously not limitative, and it will be readily understood that numerous other forms of connectors may be used with couplers in accordance with the invention, provided that the inside of the valve is adapted accordingly.

Figure 8:
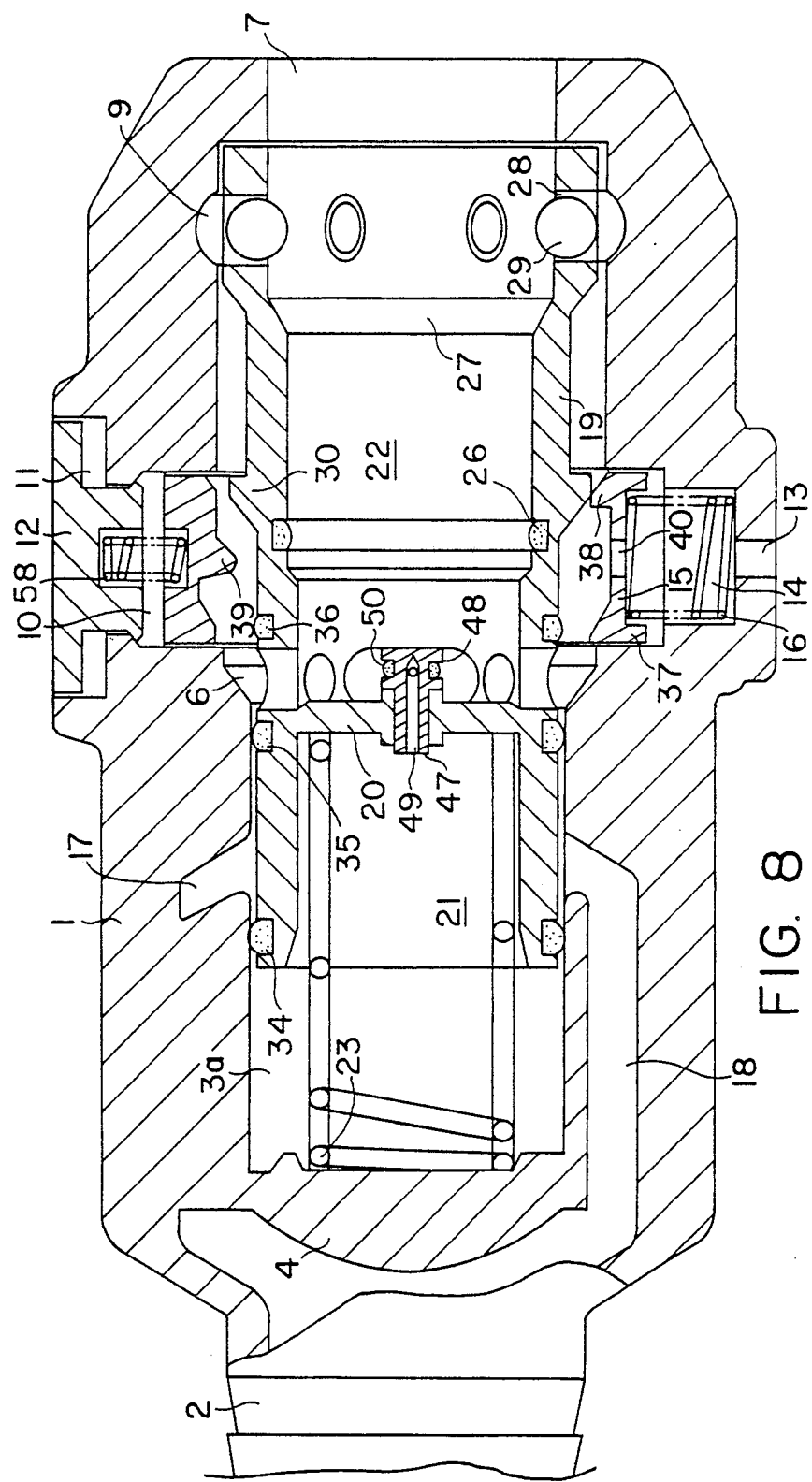

The coupler shown in FIG. 8 is practically identical to that shown in FIGS. 1 to 6 and it operates exactly in the same way, so that the same numerical references will be used for designating the same elements However, the wall 20 of valve 19 comprises a central bore in which is mounted a core 47. In the downstream chamber 22 of valve 19, core 47 has an annular groove 48 communicating with a central bore 49 closed at its downstream end and opening at its upstream end into the upstream bore 21 of valve 19. In groove 48 is housed an annular seal 50 providing sealing in the downstream-upstream direction but letting the fluid pass in the upstream-downstream direction. The discharge valve formed by core 47 and seal 50 releases the pressure in the space defined by the upstream bore 21 of valve 19 and bore 3a of the body of the coupler, in the event of wear or malfunction of the annular seal 34. Vent 5 is then superfluous. Of course, the device described here may just as well be fitted in the coupler of FIG. 7.

Figure 9:
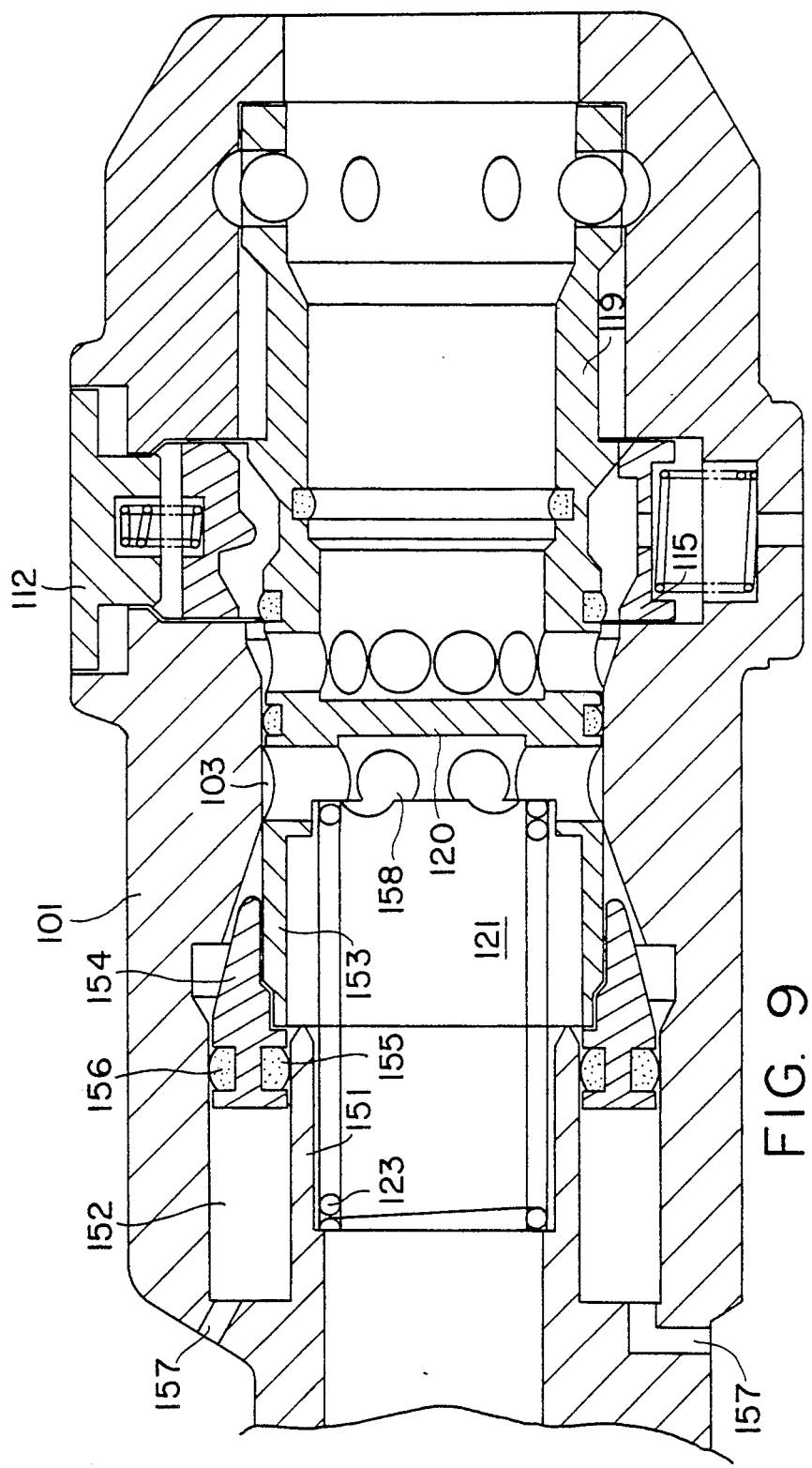

In the coupler shown in FIG. 9, the pressurized fluid arrives axially on to valve 119 which slides in chamber 103, through a duct 151 about which body 101 forms an annular chamber 152. The upstream portion 153 of valve 119 is mounted for sliding on said duct 151. A ring 154 having a width corresponding to that of the annular chamber 152, provided with two seals 155 and 156 and fixed sealingly at the end of the upstream portion 153 of valve 119, slides in the annular chamber 152 which is open to the free air through vents 157. Just upstream of its wall 120, the upstream chamber of valve 119 comprises a plurality of peripheral openings 158 opening into the portion of the annular chamber 152 downstream of ring 154. The cross section of the annular chamber 152 has the same area as the wall 120, so that the forces exerted by the pressurized fluid on wall 120 and ring 154 are equal and opposite in direction and, consequently, are balanced. In the axial direction, valve 119 is therefore only urged by a spring 123 placed between a shoulder in the upstream bore 121 of the valve and a shoulder in duct 151.

Furthermore, the downstream portion of coupler 119 and that of body 101, as well as the other elements such as the locking ring 115 and its push button 112 are identical to the corresponding elements of the coupler of FIGS. 1 to 6. Of course, a coupler with a balancing device described above may, for its downstream portion, have the configuration of the coupler illustrated in FIG. 7.

The above described couplers may be covered by a flexible protection sleeve, not shown.

Apart from the fact of being perfectly reliable, these couplers have the advantage of being formed of elements for which standardization is very advanced.

We claim:

1. Automatic coupler for a pressurized fluid circuit, to be mounted on an upstream pipe and intended to removably receive a connector (8) mounted on a downstream pipe for connection together of said pipes, whose body (1) contains a sliding valve (19), the pressure being balanced on said valve (19') in the axial direction, so that when the valve (19) moves in the body (1) it is only urged by a return spring (23), the downstream portion of the valve (19) forming a socket for receiving said connector (8), with a means for sealingly locking the latter, characterized in that it comprises a means for locking the valve (19) with respect to the body (1) in two positions:

a first position or coupling position in which the valve (19) is open, and
   a second position in which the valve (19) is closed, the connector (8) is locked in the valve and the socket receiving the connector of the valve (19) is in communication with the atmosphere, said locking means being automatically retracted then, urged by a spring, blocking the valve (19) in the open position when the connector (8) is inserted in the coupler, a means for releasing said valve locking means being provided which, when it is actuated for releasing the valve from the first position, makes a means for locking the valve operational in an intermediate position between said first and second positions, until said release means is slackened and permits the locking means in the intermediate position to retract thus causing locking in the second position, the release means being actuated a second time so that the valve (19), urged by its spring (23), can continue its movement in the body (1) towards its inoperative position, the connector (8) then being unlocked from the valve (19).

2. Coupler according to claim 1, characterized in that said means for locking in two positions, said means for locking in the intermediate position and said release means are formed by a ring (15) comprising teeth (37, 38, 39) cooperating with an annular step (30) of the valve (19), housed in an annular groove (10) of the body (1) and urged by a return spring (16), and a push button (12) for actuating the ring (15), housed in a well (11) opening into the groove (10).

3. Coupler according to claim 2, characterized in that the ring (15) and the push button are joined together by a spring (58), the push button (12) being crimped in the well (11).

4. Coupler according to claim 1, 2, or 3, characterized in that the connector (8) is sealingly locked in the valve (19) by an annular seal (26) in the valve (19) and a plurality of balls (29) engaged behind an annular step (42) of the connector (8), the balls being blocked behind said step (42) as soon as the valve has begun its downstream to upstream movement in the body (1).

5. Coupler according to claim 1, 2, or 3, characterized in that the means for balancing the pressure on the valve in the axial direction consists in causing the pressurized fluid to arrive through peripheral ducts (18) into an annular chamber (17) of the body (1), sealing between said chamber (17) and the valve (19) being provided on each side of the chamber by annular seals (34, 35, 36) working on cylindrical surfaces of the same diameter.

6. Coupler according to claim 1, 2 or 3, characterized in that said means for balancing the pressure in the axial direction on the valve consists in causing the pressurized fluid to arrive axially through a duct (151) on the transverse wall (120) of the valve (119), and balancing the force resulting from this pressure by providing upstream of said wall (120) a ring (154) fast with the valve (119) and sliding sealingly in an annular chamber ((152).

7. A coupler according to claim 5 characterized in that the connector (8) is sealingly locked in the valve (19) by an annular seal (26) in the valve (19) and a plurality of balls (29) engaged behind an annular step (42) of the connector (8), the balls being blocked behind said step (42) as soon as the valve has begun its downstream to upstream movement in the body (1).

8. A coupler according to claim 6 characterized in that the connector (8) is sealingly locked in the valve (19) by an annular seal (26) in the valve (19) and a plurality of balls (29) engaged behind an annular step (42) of the connector (8), the balls being blocked behind said step (42) as soon as the valve has begun its downstream to upstream movement in the body (1).

* * * * *